United States Patent
Gong

(10) Patent No.: US 9,160,499 B2
(45) Date of Patent: *Oct. 13, 2015

(54) BANDWIDTH AND CHANNEL NOTIFICATION FOR WIDE-CHANNEL WIRELESS COMMUNICATION

(75) Inventor: Michelle X. Gong, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/209,077

(22) Filed: Aug. 12, 2011

(65) Prior Publication Data

US 2011/0299610 A1 Dec. 8, 2011

Related U.S. Application Data

(62) Division of application No. 12/660,224, filed on Feb. 23, 2010.

(51) Int. Cl.
*H04W 72/00* (2009.01)
*H04L 5/00* (2006.01)
*H04W 72/04* (2009.01)

(52) U.S. Cl.
CPC .............. *H04L 5/0005* (2013.01); *H04L 5/003* (2013.01); *H04L 5/0092* (2013.01); *H04W 72/04* (2013.01)

(58) Field of Classification Search
CPC ....... H04L 12/26; H04L 12/413; H04B 17/00
USPC ........... 455/422.1, 450–453, 456.2, 464, 509, 455/510; 370/395.41, 332; 375/E7.141
See application file for complete search history.

(56) References Cited

U.S. PATENT DOCUMENTS

| | | | |
|---|---|---|---|
| 5,276,908 A | 1/1994 | Koohgoli et al. | |
| 5,497,505 A | 3/1996 | Koohgoli et al. | |
| 7,894,391 B2 | 2/2011 | Kwon et al. | |
| 7,903,607 B2 * | 3/2011 | Utsunomiya et al. | 370/329 |
| 8,090,391 B2 * | 1/2012 | Taki | 455/464 |
| 8,155,482 B2 * | 4/2012 | Chan et al. | 382/305 |
| 8,345,584 B2 * | 1/2013 | Rohfleisch et al. | 370/310 |
| 8,417,253 B2 * | 4/2013 | Gong | 455/450 |
| 8,605,695 B1 * | 12/2013 | Yucek et al. | 370/338 |
| 8,619,805 B2 * | 12/2013 | Flammer, III | 370/445 |
| 8,634,317 B1 * | 1/2014 | Yu | 370/252 |

(Continued)

FOREIGN PATENT DOCUMENTS

| | | |
|---|---|---|
| EP | 1641179 | 3/2006 |
| EP | 1786226 | 5/2007 |

(Continued)

OTHER PUBLICATIONS

Office Action received for Japanese Patent Application No. 2011-024207, mailed Aug. 21, 2012, 4 pgs. including 2 pgs. English translation.

(Continued)

*Primary Examiner* — Bobbak Safaipour
(74) *Attorney, Agent, or Firm* — Kacvinsky Daisak Bluni PLLC

(57) ABSTRACT

In a wireless communications network in which a device may simultaneously use multiple 20 MHz channels for communicating with another network device, various embodiments of the invention provide a way for a network controller to indicate to a mobile device which channels are to be used in communicating with the mobile device.

3 Claims, 10 Drawing Sheets

(56) References Cited

U.S. PATENT DOCUMENTS

| | | | |
|---|---|---|---|
| 2001/0021197 A1 | 9/2001 | Foore et al. | |
| 2003/0091115 A1 | 5/2003 | Yamana et al. | |
| 2004/0053624 A1* | 3/2004 | Frank et al. | 455/453 |
| 2004/0133928 A1 | 7/2004 | Jerding et al. | |
| 2006/0098605 A1* | 5/2006 | Li | 370/338 |
| 2006/0159003 A1* | 7/2006 | Nanda et al. | 370/203 |
| 2007/0060162 A1* | 3/2007 | Xhafa et al. | 455/450 |
| 2007/0160011 A1* | 7/2007 | Kim et al. | 370/332 |
| 2008/0084835 A1* | 4/2008 | Goel et al. | 370/310 |
| 2008/0101281 A1 | 5/2008 | Harris et al. | |
| 2008/0130560 A1 | 6/2008 | Khandekar et al. | |
| 2008/0137627 A1* | 6/2008 | Fischer et al. | 370/338 |
| 2008/0181139 A1 | 7/2008 | Rangarajan et al. | |
| 2008/0186890 A1* | 8/2008 | Shao et al. | 370/311 |
| 2008/0188214 A1 | 8/2008 | Qi | |
| 2008/0274710 A1* | 11/2008 | Li | 455/272 |
| 2008/0310363 A1 | 12/2008 | McBeath et al. | |
| 2009/0067403 A1* | 3/2009 | Chan et al. | 370/343 |
| 2009/0092039 A1 | 4/2009 | Niu et al. | |
| 2009/0143083 A1* | 6/2009 | Goeusse et al. | 455/458 |
| 2009/0150575 A1 | 6/2009 | Madruga et al. | |
| 2009/0154412 A1 | 6/2009 | Wang et al. | |
| 2009/0262688 A1* | 10/2009 | Tsai et al. | 370/329 |
| 2009/0285116 A1 | 11/2009 | Nanda et al. | |
| 2010/0027481 A1 | 2/2010 | Lindh et al. | |
| 2010/0169961 A1 | 7/2010 | Huh et al. | |
| 2010/0189049 A1 | 7/2010 | Lim et al. | |
| 2010/0195750 A1 | 8/2010 | Bar-Ness et al. | |
| 2010/0198952 A1 | 8/2010 | Kneckt et al. | |
| 2010/0272048 A1 | 10/2010 | Pan et al. | |
| 2010/0272058 A1* | 10/2010 | Solomon et al. | 370/329 |
| 2010/0278166 A1 | 11/2010 | Seok et al. | |
| 2011/0032875 A1* | 2/2011 | Erceg et al. | 370/328 |
| 2011/0038441 A1* | 2/2011 | Shi | 375/340 |
| 2011/0044273 A1* | 2/2011 | Maltsev et al. | 370/329 |
| 2011/0116401 A1* | 5/2011 | Banerjea et al. | 370/252 |
| 2011/0116488 A1 | 5/2011 | Grandhi | |
| 2011/0145421 A1 | 6/2011 | Yao et al. | |
| 2011/0194537 A1 | 8/2011 | Proctor, Jr. | |
| 2011/0249646 A1 | 10/2011 | Lee et al. | |

FOREIGN PATENT DOCUMENTS

| | | |
|---|---|---|
| EP | 1811730 | 7/2007 |
| GB | 2451510 | 2/2009 |
| JP | 2007088517 | 4/2007 |
| JP | 2008-546302 A | 12/2008 |
| WO | 0013426 | 3/2000 |
| WO | 2005050918 | 6/2005 |
| WO | 2006132511 | 12/2006 |
| WO | 2008018711 | 2/2008 |
| WO | 2008054027 | 5/2008 |
| WO | 2009138944 | 11/2009 |
| WO | 2009/154406 A2 | 12/2009 |
| WO | 2010/019482 A1 | 2/2010 |
| WO | 2011106316 A2 | 9/2011 |
| WO | 2011106316 A3 | 12/2011 |

OTHER PUBLICATIONS

International Search Report and Written Opinion for PCT Patent Application No. PCT/US2011/025717, mailed Sep. 7, 2012, 5 pgs.

Jingbin Zhang et al., "TMMAC: An Energy Efficient Multi-Channel MAC Protocol for Ad Hoc Networks", ICC'07, pp. 3554-3561, Jun. 24-28, 2007, 8 pgs.

Boyer et al., "Multihop Diversity in Wireless Relaying Channels", IEEE Transactions on Communications, vol. 52, No. 10, Oct. 2004.

Supplementary European Search Report received for European Patent Application No. 11747928.7, mailed Aug. 8, 2013, 7 pages.

Supplementary European Search Report received for European Patent Application No. 13163070.9, mailed Aug. 8, 2013, 7 pages.

Office Action received for Japanese Patent Application No. 2011-024207, mailed Feb. 26, 2013, 1 Page Of OA and 1 Page Of English Translation.

International Search Report and Written Opinion for PCT Patent Application No. PCT/US2011/025717, mailed Oct. 26, 2011, 8 Pages.

Office Action received for Chinese Patent Application No. 201110054047.2, mailed Apr. 16, 2014, 9 Pages Of OA and 15 Pages Of English Translation.

Office Action received for European Patent Application No. 11747928.7, mailed Aug. 27, 2013, 1 page.

Office Action received for Chinese Patent Application No. 201110054047.2, mailed Jul. 24, 2014, 3 Pages Of Office Action and 4 Pages Of English Translation.

Office Action received for Japanese Patent Application No. 2012-264391, mailed Jun. 17, 2014, 2 Pages Of Office Action and 1 Page Of English Translation.

Office Action received for Japanese Patent Application No. 2012-264391, mailed Oct. 29, 2014, 2 Pages Of Office Action and 2 Pages Of English Translation.

Office Action received for Chinese Patent Application no. 201210532271.2, mailed Nov. 13, 2014, 7 Pages Of Office Action and 8 Pages Of English Translation.

Office Action received for Japanese Patent Application No. 2012-264391, mailed Feb. 3, 2015, 2 Pages Of Office Action and 3 Pages Of English Translation.

Office Action received for Korean Patent Application No. 2012-7021991, mailed Oct. 10, 2013, 3 pages English translation.

Office Action received for Japanese Patent Application No. 2012-264391, mailed Oct. 29, 2013, 3 pages including 1 page English translation.

Office Action received for Chinese Patent Application No. 201110054047.2, mailed Aug. 2, 2013, 26 pages including 15 page English translation.

* cited by examiner

| Element ID | Length | Number of non-primary channels | Regulatory Class 1 | Channel Number 1 | ... | Regulatory Class N | Channel Number N |
|---|---|---|---|---|---|---|---|
| | | 22 | Channel 44 | 26 | Channel 149 | 26 | Channel 157 |

FIG. 2

| L-STF | L-LTF | L-SIG | VHT-SIG | VHT-STF | VHT-LTF | VHT-SIG2 | VHT-LTFs | DATA |
| --- | --- | --- | --- | --- | --- | --- | --- | --- |
| L-STF | L-LTF | L-SIG | VHT-SIG | | | | | |
| L-STF | L-LTF | L-SIG | VHT-SIG | | | | | |
| L-STF | L-LTF | L-SIG | VHT-SIG | | | | | |

| Bits | Bandwidth (MHz) |
|---|---|
| 00 | 20 |
| 01 | 40 |
| 10 | 60 |
| 11 | 80 |

FIG. 5A

| Bits | Bandwidth (MHz) |
|---|---|
| 000 | 20 |
| 001 | 40 |
| 010 | 60 |
| 011 | 80 |
| 100 | 100 |
| 101 | 120 |
| 110 | 140 |
| 111 | 160 |

FIG. 5B

| Bit | Channel Number | Bit | Channel Number |
|---|---|---|---|
| 1 | 36 | 13 | 116 |
| 2 | 40 | 14 | 120 |
| 3 | 44 | 15 | 124 |
| 4 | 48 | 16 | 128 |
| 5 | 52 | 17 | 132 |
| 6 | 56 | 18 | 136 |
| 7 | 60 | 19 | 140 |
| 8 | 64 | 20 | 149 |
| 9 | 100 | 21 | 153 |
| 10 | 104 | 22 | 157 |
| 11 | 108 | 23 | 161 |
| 12 | 112 | 24 | 165 |

FIG. 6

| Bit | Channel Number |
|---|---|
| 1 | 1st Channel (44) |
| 2 | 2nd Channel (149) |
| 3 | 3rd Channel (157) |

FIG. 7

Segment 1

| Bits | Bandwidth (MHz) |
|---|---|
| 00xx | 20 |
| 01xx | N/A |
| 10xx | Lower 40 |
| 11xx | 80 |

Segment 2

| Bits | Bandwidth (MHz) |
|---|---|
| xx00 | 0 |
| xx01 | Upper 40 |
| xx10 | Lower 40 |
| xx11 | 80 |

FIG. 8

| BW bits ($b_3b_2b_1b_0$) | BW of Segment 1 (channel #) | BW of Segment 2 (channel #) | Total BW |
|---|---|---|---|
| 0000 | 20 MHz (36) | — | 20 MHz |
| 1000 | 40 MHz (36, 40) | — | 40 MHz |
| 1100 | 80 MHz (36, 40, 44, 48) | — | 80 MHz |
| 1010 | 40 MHz (36, 40) | 40 MHz (149, 153) | 80 MHz |
| 1001 | 40 MHz (36, 40) | 40 MHz (157, 161) | 80 MHz |
| 1011 | 40 MHz (36, 40) | 80 MHz (149, 153, 157, 161) | 120 MHz |
| 1101 | 80 MHz (36, 40, 44, 48) | 40 MHz (157, 161) | 120 MHz |
| 1110 | 80 MHz (36, 40, 44, 48) | 40 MHz (149, 153) | 120 MHz |
| 1111 | 80 MHz (36, 40, 44, 48) | 80 MHz (149, 153, 157, 161) | 160 MHz |

FIG. 9

| BW bits ($b_2b_1b_0$) | BW of Segment 1 (channel #) | BW of Segment 2 (channel #) | Total BW |
|---|---|---|---|
| 000 | 20 MHz (36) | – | 20 MHz |
| 001 | 40 MHz (36, 40) | – | 40 MHz |
| 010 | 80 MHz (36, 40, 52, 56) | – | 80 MHz |
| 011 | 40 MHz (36, 52) | 40 MHz (149, 153) | 80 MHz |
| 100 | 40 MHz (36, 40) | 40 MHz (157, 161) | 80 MHz |
| 101 | 40 MHz (36, 40) | 80 MHz (149, 153, 157, 161) | 120 MHz |
| 110 | 80 MHz (36, 40, 44, 48) | 40 MHz (149, 153) | 120 MHz |
| 111 | 80 MHz (36, 40, 60, 64) | 80 MHz (149, 153, 157, 161) | 160 MHz |

FIG. 10

BANDWIDTH AND CHANNEL NOTIFICATION FOR WIDE-CHANNEL WIRELESS COMMUNICATION

CROSS-REFERENCE TO RELATED APPLICATIONS

This application is a divisional of U.S. patent application Ser. No. 12/660,224, filed Feb. 23, 2010, and claims priority to that filing date for all applicable subject matter.

BACKGROUND

In some conventional networks, the devices may communicate with each other over multiple channels, each having a defined channel width. For example, some standards define a series of channels, each having a center frequency spaced 20 MHz from the next adjacent channel. The defined bandwidth of each channel is therefore approximately 20 MHz, which can be used in wireless communications between devices. A later standard defined a channel bandwidth of 40 MHz. To preserve backward compatibility, each 40 MHz channel may be achieved by combining two adjacent 20 MHz channels. It's a comparatively simple matter for a network controller to assign a 40 MHz channel when it only has to indicate a primary 20 MHz channel and the next adjacent channel up (or down). But recent proposals have been made to expand the channel bandwidth even further to provide a channel width of 80 MHz, 160 MHz, or any other multiple of 20 MHz greater than 40 MHz. Further, some of the indicated 20 MHz channels might not even be adjacent to any of the other 20 MHz channels. Conventional techniques for allocating 20 MHz channels to achieve a channel bandwidth greater than 40 MHz are not adequate for this scenario.

BRIEF DESCRIPTION OF THE DRAWINGS

Some embodiments of the invention may be understood by referring to the following description and accompanying drawings that are used to illustrate embodiments of the invention. In the drawings:

FIG. 2 shows an information element (IE) for indicating which narrow channels may be combined to form a wide channel, according to an embodiment of the invention.

FIG. 3 shows a portion of a transmission, according to an embodiment of the invention.

FIG. 4 shows a portion of a transmission, according to another embodiment of the invention.

FIGS. 5A and 5B show bitmap formats for indicating which of the allocated narrow channels are to be used in the current transmission, according to an embodiment of the invention.

FIG. 6 shows another bitmap format for indicating which of the allocated narrow channels are to be used in the current transmission, according to an embodiment of the invention.

FIG. 7 shows a modified version of the bitmap of FIG. 6, according to an embodiment of the invention.

FIG. 8 shows yet another bitmap format for indicating which channels are to be used in the current transmission, according to an embodiment of the invention.

FIG. 9 shows a more detailed view of the bitmap of FIG. 8, according to an embodiment of the invention.

FIG. 10 shows still another bitmap format for indicating which channels are to be used in the current transmission, according to an embodiment of the invention.

DETAILED DESCRIPTION

Figure 1:
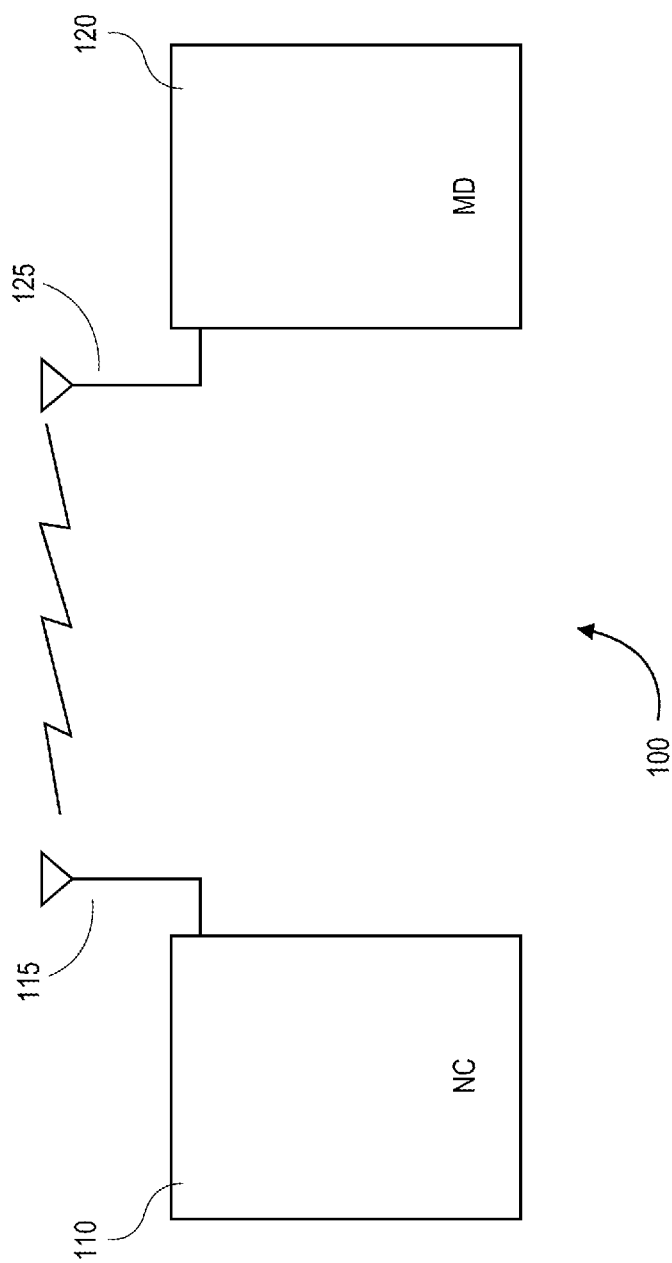
FIG. 1 shows a wireless network, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing information in a form readable by one or more computers. For example, a computer-readable medium may include a tangible storage medium, such as but not limited to read only memory (ROM); random access memory (RAM); magnetic disk storage media; optical storage media; a flash memory device, etc.

The term "wireless" may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. A wireless device may comprise at least one antenna, at least one radio, and at least one processor, where the radio's transmitter transmits signals through the antenna that represent data and the radio's receiver receives signals through the antenna that represent data, while the processor may process the data to be transmitted and the data that has been received. The processor may also process other data which is neither transmitted nor received.

As used within this document, the term "network controller" (NC) is intended to cover devices that schedule and control, at least partially, wireless communications by other devices in the network. Network controllers may also be known as base stations (BS), access points (AP), central points (CP), or any other term that may arise to describe the functionality of a network controller.

As used within this document, the term "mobile device" (MD) is intended to cover those devices whose wireless communications are at least partially scheduled and controlled by the network controller. Mobile devices may also be known as mobile nodes, STA's, subscriber stations (SS), user equipment (UE), or any other term that may arise to describe the functionality of a mobile device. Mobile devices may generally move during such communications, but movement is not required.

As used in this document, a 'narrow' channel is a wireless communications channel having a pre-defined bandwidth in the frequency spectrum, while a 'wide' channel is a channel having the combined portions of the frequency spectrum occupied by multiple ones of these narrow channels. In some embodiments, these narrow channels don't have to be contiguous, i.e., two narrow channels that are included in the wide channel may be separated by one or more narrow channels that are not included in the wide channel. For simplicity of description, the narrow channels may frequently be described herein as having a 20 MHz width, while the wide channels may be described as having a bandwidth that is an integer multiple of 20 MHz, but other embodiments may use narrow-channel bandwidths other than 20 MHz. As used in this document, 'available' channels are those channels that are permitted for use within the network. This may be defined by industry standards, for example, or by the NC for the collective use by the devices in its network. As used in this document, 'allocated' channels are those available channels that the NC has specified for use by a particular MD, and may be changed from time to time by the NC.

In a wireless communications network in which a wide channel can be defined by combining multiple narrow channels, various embodiments of the invention may enable a NC to indicate to a MD which of those narrow channels the MD may use in subsequent wide-channel communication, and may also enable a way to specify which of those indicated channels are actually being used in those subsequent communications.

FIG. 1 shows a wireless network, according to an embodiment of the invention. In network 100, NC 110 is shown communicating wirelessly with mobile device 120, through their antennas 115 and 125, respectively. Each illustrated antenna 115, 125 may be a single antenna or multiple antennas, depending on the technology being used. Although only a single mobile device (MD) 125 is shown in network 100, a typical network may have multiple MD's communicating with the NC during a particular time period.

FIG. 2 shows an information element (IE) for indicating which narrow channels may be combined to form a wide channel, according to an embodiment of the invention. In the various standards that fall within the scope of IEEE 802.11, information elements are used as a flexible way to provide new information in the data stream without having to rewrite the basic communication protocols each time a new type of information is incorporated. In some embodiments, the IE may be located in the body of a MAC frame, but other embodiments may place it elsewhere. This particular IE may be included in a larger transmission from the NC to a MD, to indicate to that MD which narrow channels the MD may use for subsequent wide channel communications. FIG. 2 shows a particular arrangement of fields in the IE, but other arrangements may also be used. In some embodiments, the MD may choose to use all or only some of the indicated narrow channels in its subsequent wide channel communications, and may change that choice as often as it is possible to specify such a change.

The IE may begin with the standard Element ID field, which indicates what type of IE this is (in this case, an IE that defines which narrow channels may be included in the wide channel), followed by the Length field, which indicates how much of the following bit stream is a part of this IE. The next field shows how many non-primary channels are indicated by this IE (three are shown in FIG. 2). The primary channel is the narrow channel that a device may use when the other narrow channels are still unknown, and can be used in both wide- and narrow-channel communication. The non-primary channels are therefore the remaining narrow channels that may be combined with the primary channel to construct the wide channel defined by this IE. In some embodiments, the primary channel is always used in communications, either by itself or in combination with the non-primary channels. The primary channel may have been previously defined and identified through means that are beyond the scope of this document.

The rest of the illustrated IE identifies the non-primary channels in multiple Channel Number fields, with each one identifying a specific non-primary narrow channel. The IE may also contain fields to indicate the regulatory class. In the illustrated example there is a separate regulatory class field associated with, and preceding, each channel number field, but other embodiments may differ (e.g., a single regulatory class may be used for all the indicated narrow channels, thus requiring only a single field to define that regulatory class). Among other things, the regulatory class may specify the bandwidth of the narrow channel. This is especially useful in environments in which the bandwidth of the narrow channels is not the same throughout all the available narrow channels. In the illustrated example, the IE contains no information on the primary channel (since it is already known), but other embodiments may include information on the primary channel. In other embodiments, the IE may also contain other information not shown here.

FIG. 3 shows a portion of a transmission, according to an embodiment of the invention. For the purposes of illustration, it is assumed a previous communication has specified three non-primary narrow channels that can be used in combination with a primary fourth channel to communicate over a wide channel, and these four 20 MHz channels are indicated by the four illustrated rows. For simplicity, it may be assumed these narrow channels are contiguous, although this assumption is not required for an understanding of the drawing.

The format shown in FIG. 3 may be part of a preamble of a larger transmission. At the beginning of this transmission, the receiving device may not know which of the narrow channels the transmitting device is going to use. To make sure the preamble is received, the transmitting device may transmit the first few fields in parallel on each of the four narrow channels (including the primary channel). This should guarantee that no matter which narrow channel the receiving device monitors, it can correctly receive these fields. It also provides a backup signal in case one of the narrow channels suffers from interference, distortion, or weak signal strength.

The first two fields are the Short Training Field (STF) and the Long Training Field (LTF), which the receiving device will need to properly acquire and synchronize on the signal. The next two fields (SIG) may provide information on how the remaining transmission is going to use the indicated channels. In this case, they indicate the subsequent signals will be modulated into an 80 MHz wide channel. A repeat of the training may then be done on this new 80 MHz wide channel.

Use of the indicated wide channel may then continue for the remainder of the packet, frame, or whatever unit of communication it applies to. The illustrated fields include prefixes to indicate legacy protocols (L) and very high throughput (VHT) protocols to accommodate both older legacy devices and newer high throughput devices, but these protocols may be different than shown, depending on the capabilities of the system.

Figure 4:
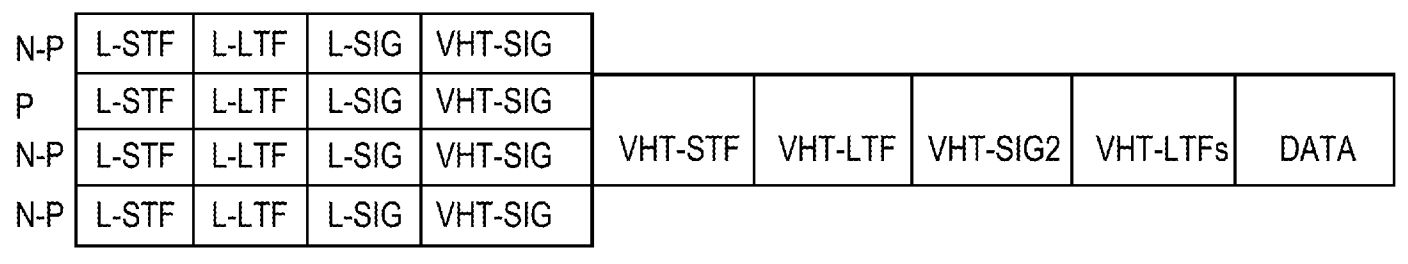

FIG. 4 shows a portion of a transmission, according to another embodiment of the invention. The primary difference between FIG. 3 and FIG. 4 is that the transmitting device has chosen to use only two of the four allocated narrow channels, to create a 40 MHz wide channel for its communication. It should be noted that the primary channel 'P' (the second narrow channel in this example) is included in the two narrow channels that are selected for use.

FIGS. 5A and 5B show bitmap formats for indicating which of the allocated narrow channels are to be used in the current transmission, according to an embodiment of the invention. In some embodiments the bitmap is located in the VHT-SIG field of the preamble (e.g., as shown in FIGS. 3 and 4), but other embodiments may place it elsewhere. After the NC has specified (e.g., with the IE of FIG. 2) which narrow channels the MD may use in its wide channel transmissions, the MD may use the bitmap format to specify which of those allocated channels it is using in its current transmission. Similarly, in an exchange of information between the NC and MD, the NC may indicate which of the previously-allocated channels it is using in its current transmission to the MD.

In the case where the channels are all contiguous and the primary channel is known to be the highest (or lowest) narrow channel, the formats of FIGS. 5A, 5B provide a compact method of indicating which narrow channels may be combined into a wide channel. Narrow channels with a width of 20 MHz are shown, but other channel widths may be used instead.

If the maximum wide-channel width in the network is 80 MHz, only two bits may be needed to specify whether the channels being used by the transmitting device are to cover 20, 40, 60, or 80 MHz, as shown in FIG. 5A. Since only contiguous channels are indicated with this format, knowing the primary channel and the number of contiguous non-primary channels is sufficient to define which channels they are. Three bits may be sufficient to expand this up to 100, 120, 140, or 160 MHz, as shown in FIG. 5B. Additional bits may expand this to even larger wide channels.

FIG. 6 shows another bitmap format for indicating which of the allocated narrow channels are to be used in the current transmission, according to an embodiment of the invention. In this format, each bit in the map represents a particular narrow channel. For example, if that bit is a '1', the associated channel is selected, while a value of '0' indicates that channel is not selected. (Of course, the opposite polarities may be used instead.) In this example, there are 24 bits to represent 24 narrow channels, and the channels are labeled with channel numbers 36 through 165 in increments of 4, which is a common method of numbering channels under some versions of the industry standard IEEE 802.11. However, other numbers of bits and other channel numbering conventions may also be used with this format. This format is extremely flexible, since it does not require contiguous channels, and all the channels in the spectrum are represented (even those that were not allocated). However, using that many bits in every preamble may be unacceptable in some environments.

FIG. 7 shows a modified version of the bitmap of FIG. 6, according to an embodiment of the invention. The difference between FIG. 6 and FIG. 7 is that in FIG. 6, each bit is associated with one of the channels permitted under the current regulations and industry standards, while in FIG. 7 each bit is associated with one of the channels previously allocated by the NC. Using the allocated channels of FIG. 2 as an example, the first bit of FIG. 7 is associated with the first channel indicated in the IE of FIG. 2 (channel 44). The second and third bits of FIG. 7 are associated with the second and third channels indicated in the IE (channels 149 and 157, respectively). This has reduced the 24-bit bitmap to a 3-bit bitmap, which consumes much less space in the preamble, but still allows the maximum number of allocated channels to be specified. Unlike the format of FIGS. 5A and 5B, the format of FIG. 7 doesn't require that they be contiguous channels.

In earlier industry standards, pre-defined narrow channels have had a width of 20 MHz, and wider channels were constructed by combining these 20 MHz channels on the fly. However, with the increased use of channels having a width of 40 MHz, certain specific pairs of adjacent 20 MHz channels are being pre-defined as 40 MHz channels. For example, 40 MHz channels may be pre-defined by an industry standard as consisting of any of these two pairs of adjacent 20 MHz channels: 36/40, 44/48, 52/56, 60/64, 100/104, 108/112, 116/120, 124/128, 132/136, 149/153, 157/161. Certain regulatory classes may specify that a narrow channel has a 40 MHz width and whether the adjacent channel is up or down from the primary 20 MHz channel, so the IE of FIG. 2 may be used to indicate these without further definition in the communication itself In such cases, it is possible to specify each pre-defined 40 MHz channel with a single bit in a bitmap. The bitmaps of FIGS. 5A, 5B, 6, and 7 may be modified in such cases by simply replacing each 20 MHz channel with a 40 MHz channel, and/or by replacing each 20 MHz bandwidth with a 40 MHz bandwidth.

In some network definitions, the available channels may be divided into segments, and the selected channels in each segment may be indicated separately. The selected narrow channels may have any pre-determined width, such as 20 MHz, 40 MHz, or other width. For example, the pre-defined 20 MHz channels 36, 40, 44, and 48 may be placed in Segment 1, and channels 149, 153, 157, and 161 may be placed in Segment 2. The selection may be a bit-to-channel correspondence (similar to FIGS. 6 and 7) or a total-bit-value to total-bandwidth correspondence (similar to FIGS. 5A and 5B). Of course, other embodiments may use more than two segments, and/or more that two bits per segment without deviating from the basic concept.

FIG. 8 shows yet another bitmap format for indicating which channels are to be used in the current transmission, according to an embodiment of the invention. In this example, the first two bits of a four-bit entry may indicate the selected channels in Segment 1 and the next two bits of that entry may indicate the selected channels in Segment 2. As shown in FIG. 8, a value of '00' in the first two bits may select the primary channel only, a value of '10' may selects the lower 40 MHz of channels in Segment 1 (including the primary channel), while a value of '11' may select all 80 MHz of channels in Segment 1. Similarly, a value of 00 in the next two bits may select none of the channels in Segment 2, while a value of '01' may select the upper 40 MHz of channels, a value of '10' may select the lower 40 MHz of channels, and a value of '11' may select both the upper and lower 40 MHz of channels for a total of 80 MHz in Segment 2. Note that in this example, each individual '1' bit indicates the selection of a 40 MHz channel that consists of two adjacent 20 MHz channels.

FIG. 9 shows a more detailed view of the bitmap of FIG. 8, according to an embodiment of the invention. In this example, channel 36 is the primary 20 MHz channel, channels 40, 44, and 48 represent the non-primary 20 MHz channels in Segment 1, and channels 149, 153, 157, and 161 represent the non-primary 20 MHz channels in Segment 2. As in FIG. 8, each '1' bit selects a 40 MHz combination of two adjacent 20 MHz channels (36/40, 44/48, 149/153, or 157/161)., while the value '0000' selects only the 20 MHz primary channel.

FIG. 10 shows still another bitmap format for indicating which channels are to be used in the current transmission, according to an embodiment of the invention. Most of the entries in the previously described bitmaps have been defined in one of two ways: 1) each bit corresponds to a specific narrow channel, or 2) the value of a multi-bit number corresponds to the collective bandwidth of a group of contiguous narrow channels. But in another approach, the value of a multi-bit number in the bitmap may correspond to a particular pre-defined combination of channels, which may have any bandwidth and may be non-contiguous. This approach is extremely flexible in the variety of channels and channel widths that may be indicated with a small multi-bit combination, since those factors are pre-defined and therefore don't need to be defined by the bitmap.

FIG. 10 shows an example. In the illustrated embodiment, a simple three-bit value can indicate eight different combinations of channels. These channels may have various widths, may be placed in different segments, and may be contiguous or non-contiguous. In such an embodiment, there is no pre-defined correspondence between any particular bit and any particular channel(s), and no internal limit on how many of the available channels may be represented by a particular value.

In still another variation, each bit may represent a different pre-defined multi-channel combination, and a value containing multiple '1' bits would therefore indicate a larger combination of two or more of the pre-defined channel combinations.

Figure 11:
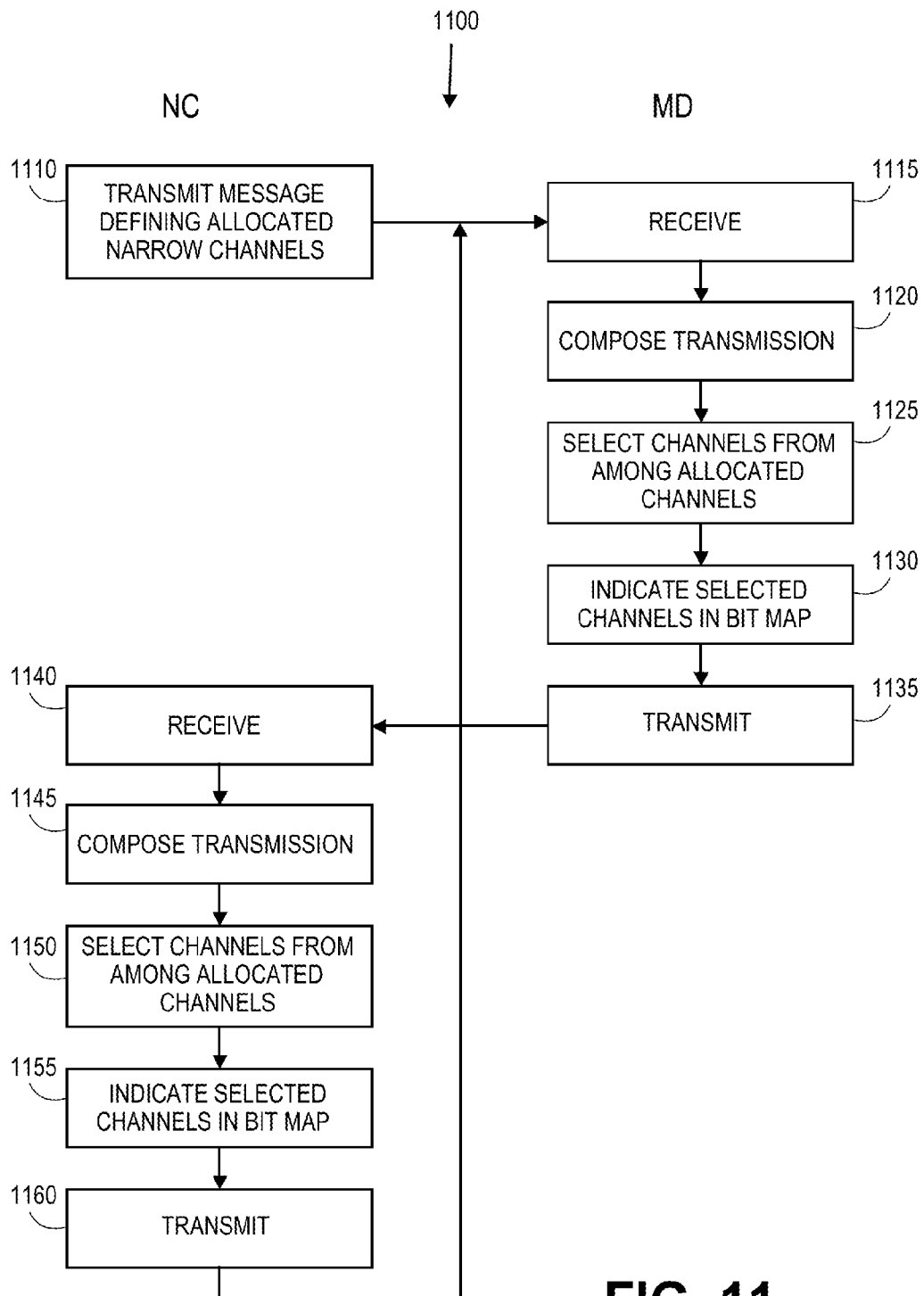
FIG. 11 shows a flow diagram of a method of allocating and selecting channels for subsequent communication, according to an embodiment of the invention.

FIG. 11 shows a flow diagram of a method of allocating and selecting channels for subsequent communication, according to an embodiment of the invention. Flow diagram 1100 shows activities by both the NC and an MD in their communications with each other. At 1110, the NC may transmit a message containing information that allocates specific ones of the available narrow channels that may be used in subsequent communications. In some embodiments, this message may be a beacon, a probe response, or a neighbor report, but other embodiments may differ. In some embodiments, the information may be contained within an Information Element (IE), as IE's are defined in various industry standards (e.g., such as IEEE 802.11).

When the MD receives the message at 1115, it may record the list of allocated channels for use in subsequent communications. When ready to transmit back to the NC, the MD may compose the transmission at 1120, and at 1125 select which of the allocated channels it will use for this transmission. This selection may be based on various factors which are not discussed here in detail. At 1130 the MD may create a bitmap for inclusion in this transmission, with that bitmap indicating which channels it has selected for this transmission. In some embodiments the bitmap may be placed in a SIG field in the preamble of the transmission. At 1135 the MD transmits the message to the NC, which receives it at 1140.

If the NC chooses to use the same list of allocated channels in its communications with this MD, it may perform the same basic process at 1145-1160 that was performed by the MD at 1120-1135. However, at 1150 it may select the same or different channels than were selected by the MD at 1125. This process of communicating back and forth may continue with the same list of allocated channels at 1115-1160 for as long as the NC chooses. However, if the NC chooses to change the list of allocated channels, it may return to 1110 to transmit the new list to the MD, including the information in whatever type of message is deemed suitable.

In some embodiments, the NC may transmit a different list of allocated channels to the MD than the NC will use in its subsequent transmissions to the MD (i.e., the list will be different for NC-to-MD transmissions than for MD-to-NC transmissions). In some embodiments, the list of allocated channels may be used for direct communications between the MD and another MD, where such peer-to-peer communications are allowed.

The foregoing description is intended to be illustrative and not limiting. Variations will occur to those of skill in the art. Those variations are intended to be included in the various embodiments of the invention, which are limited only by the scope of the following claims.

What is claimed is:

1. An apparatus, comprising
   a first wireless communications device containing a processor, a memory, and a radio having at least one receiver and at least one transmitter, the first device configured to:
   receive, through the at least one receiver, a communication comprising information defining allocated narrow channels the first wireless communications device may use for subsequent transmissions;
   select particular ones of the allocated narrow channels for subsequent communications over a wide channel;
   indicate the selected channels in a multi-bit bit map;
   transmit the bit map in a SIG field of a preamble of a transmission;
   wherein each combination of multiple combinations of bits in the bitmap indicates a predetermined combination of selected channels for a subsequent communications;
   wherein said each combination of multiple combinations of bits indicates a bandwidth for the predetermined combination of selected channels equal to an integer multiple of 20 MHz.

2. A method, comprising:
   receiving, by a first wireless communications device, a wireless communication comprising information defining allocated narrow channels the first wireless communications device may use for subsequent transmissions;
   selecting particular ones of the allocated narrow channels for subsequent communications over a wide channel;
   indicating the selected channels in a multi-bit bit map;
   transmitting the bit map in a SIG field of a preamble of a transmission;
   wherein each combination of multiple combinations of bits in the bitmap indicates a predetermined combination of selected channels for a subsequent communication;
   wherein said each combination of multiple combinations of bits indicates a bandwidth for the predetermined combination of selected channels equal to an integer multiple of 20 MHz.

3. A computer-readable non-transitory storage medium that contains instructions, which when executed by one or more processors result in performing operations comprising:
   receiving, by a first wireless communications device, a wireless communication comprising information defining allocated narrow channels the first wireless communications device may use for subsequent transmissions;
   selecting particular ones of the allocated narrow channels for subsequent communications over a wide channel;
   indicating the selected channels in a multi-bit bit map;

transmitting the bit map in a SIG field of a preamble of a transmission;
wherein each combination of multiple combinations of bits in the bitmap indicates a predetermined combination of selected channels for a subsequent communication;
wherein said each combination of multiple combinations of bits indicates a bandwidth for the predetermined combination of selected channels equal to an integer multiple of 20 MHz.

\* \* \* \* \*